(No Model.)
J. S. HOYT.
POTATO DIGGER AND GATHERER.
No. 317,792. Patented May 12, 1885.
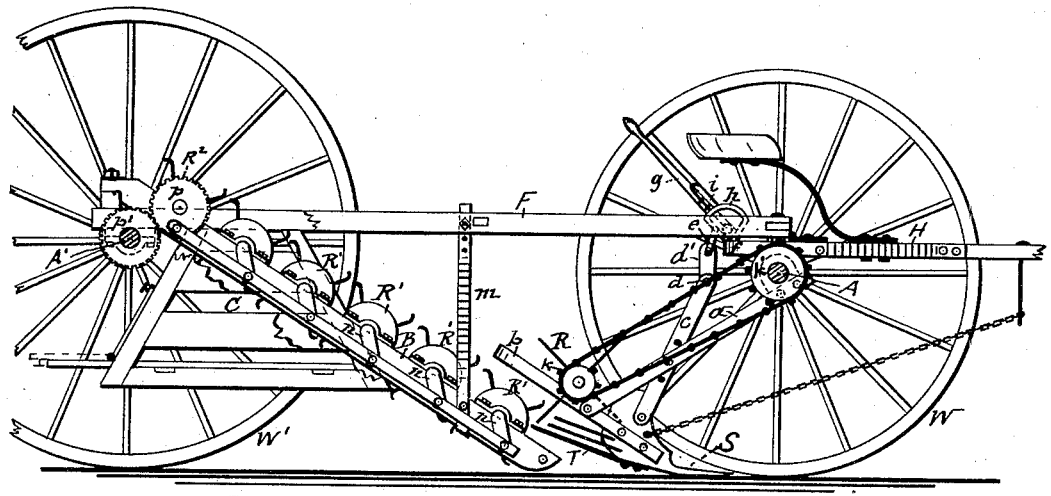
FIG-1-
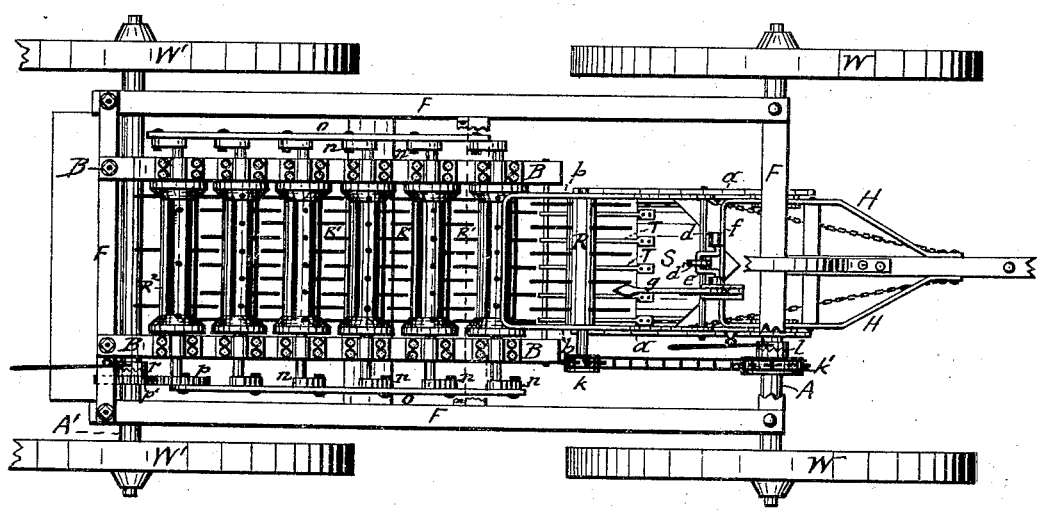
FIG-2-
ATTEST—
C. E. Raymond
C. H. Gibbs
INVENTOR—
Jacob S. Hoyt
per Dudley, Laass & Hay
his attys
N. PETERS, Photo-Lithographer, Washington, D. C.

UNITED STATES PATENT OFFICE.

JOEL S. HOYT, OF SYRACUSE, NEW YORK.

POTATO DIGGER AND GATHERER.

SPECIFICATION forming part of Letters Patent No. 317,792, dated May 12, 1885.

Application filed June 25, 1884. (No model.)

*To all whom it may concern:*

Be it known that I, JOEL S. HOYT, of Syracuse, in the county of Onondaga, in the State of New York, have invented new and useful Improvements in Potato Diggers and Gatherers, of which the following, taken in connection with the accompanying drawings, is a full, clear, and exact description.

This invention consists in a novel construction of a machine designed to dig potatoes, separate them from the soil dug up with them, and deposit the potatoes in a receptacle connected with the machine, all as hereinafter fully described, and specifically set forth in the claims.

In the accompanying drawings, Figure 1 is a side elevation of my invention with the nigh wheels removed and a portion of the frame broken away to better illustrate the more essential features, and Fig. 2 is a plan view of the same.

Similar letters of reference indicate corresponding parts.

S designates the digger, consisting of a scoop hung on the forward axle, A, by arms $a$, which are loosely connected to the axle and have their lower end secured to a rearward-extended yoke, $b$, fixed to the sides of the scoop. Said scoop is sustained adjustably in its position by means of vertical arms $c$, connected to the sides of the scoop and extended across the arms $a$, and provided at the point of said crossing with a series of bolt-holes for the reception of a bolt, by which the arms $c$ are clamped on the arms $a$. The two arms $c\ c$ are connected with each other at their upper end by a cross-bar, $d$, and this cross-bar is connected by a link, $d'$, with a crank-shaft, $e$, mounted in suitable bearings on a cross-bar, $f$, which latter is rigidly attached to the rear end of the hounds H, or formed in one piece with a metal strap forming said hounds, as ilustrated in Fig. 2 of the drawings. By means of a lever, $g$, connected to the crank-shaft $e$, the latter can be turned so as to cause it to raise or lower the scoop. A segmental rack, $h$, affixed to the bar $f$ and engaged by a dog, $i$, on the lever, serves to retain the scoop in its required position. The scoop has secured to its rear edge rearward-projecting tines T, and over said tines is arranged a rotary rake, R, in the form of a shaft journaled on the arms $a$, hereinbefore described, and provided with radial teeth which play between the tines T T. Said rake receives its motion from a sprocket-wheel, $k$, on the end of the rake-shaft, connected by a drive-chain with a sprocket-wheel, $k'$, mounted loose on the forward axle, A, which axle is fixed to the wheels W, so as to rotate therewith, and is provided with a spline on which slides a clutch, $l$, adapted to engage or interlock with the sprocket-wheel $k'$, and thus transmit motion thereto.

Back of the described digger is arranged the separator, consisting of the following instrumentalities: At a proper distance at the rear of the wheels W is another set of wheels, W', fixed to an axle, A', so as to impart rotary motion to said axle, and on the two axles A A' is supported a frame, F, to the rear end of which are connected two stringers, B B, which are inclined toward the rear end of the scoop S, and are supported thereat by rods or straps $m$, connected with said stringers and with the frame F, the connection with the latter being made adjustable to admit of raising and lowering the forward end of the stringers B B, as may be desired. On the said stringers are mounted a series of rotary rakes, R' R', in the form of shafts or cylinders arranged between the two stringers and at right angles thereto and journaled thereon, which shafts are distributed successively over the length of the stringers and are provided with radial teeth, which are arranged to play between the teeth of the adjacent shafts. The first of the rakes R' is in proximity to the tines T of the digger or scoop S, so as to receive the delivery thereof, and the whole series of said rakes is rotated synchronously and in one and the same direction by means of cranks $n$ on the ends of the respective rake-shafts and a pitman, $o$, connected with the respective cranks and with a wrist-pin on a wheel, $p$, connected to the shaft of a rake, $R^2$, mounted on the upper end of the stringers B B, said wheel $p$ receiving rotary motion from a wheel, $p'$, mounted loosely on the hind axle, A', and detachably connected with a suitable clutch, $r$, on the axle, which clutch can be thrown out of connection with the wheel $p'$, so as to stop the motion of said wheel during the movement of the axle $A^2$, when desired. The wheels $p\ p'$ may be either in the form of toothed gears or smooth-faced friction-wheels. Underneath the stringer is a receptacle, C, suspended from the frame F in such relative position as to bring said receptacle under the uppermost of the rakes R' and leave the last rake, $R^2$, back of the receptacle, for the purpose hereinafter explained.

The operation of my invention is as follows: The scoop S being properly adjusted in its position to enter the ground to the requisite depth to gather the potatoes and the earth inclosing the same, as the gathered substance passes toward the rear of the scoop it encounters the rotary rake R, which propels said substance over the tines T to the first of the series of rakes R', and at the same time breaks up the earth and causes the same to fall through the spaces between the tines. From the rake R' the potatoes and adherent earth are transferred successively over the entire series of rakes R', and in their said passage the potatoes become thoroughly cleaned, and from the uppermost of said rakes they drop into the receptacle C. The teeth of the last rake, $R^2$, are arranged farther apart, so as to allow the potatoes to drop between them and into the subjacent receptacle C, the function of said teeth being to catch the stalks, grasses, and weeds, and throw the same over the back of the receptacle.

Having described my invention, what I claim as new is—

1. In combination with the scoop S, the tines T T, rotary rake R over said tines, and the series of rotary rakes R' R', arranged successively in higher planes, and with the first of said rakes R' in proximity to the tines T T, substantially as described and shown.

2. In combination with the rotary rakes R' R', arranged successively in higher planes, the uppermost rake, $R^2$, having its teeth set farther apart, and the receptacle C, arranged below said rake, substantially as described and shown, for the purpose set forth.

In testimony whereof I have hereunto signed my name and affixed my seal, in the presence of two attesting witnesses, at Syracuse, in the county of Onandaga, in the State of New York, this 11th day of June, 1884.

JOEL S. HOYT. [L. S.]

Witnesses:
  FREDERICK H. GIBBS,
  WM. C. RAYMOND.